Feb. 9, 1932.  C. W. WYMAN  1,844,833
ELECTRIC MOTOR CONTROLLING SYSTEM
Filed Dec. 31, 1927

INVENTOR:
CHARLES W. WYMAN.
BY *Louis A. Maxson*
ATT'Y.

Patented Feb. 9, 1932

1,844,833

UNITED STATES PATENT OFFICE

CHARLES W. WYMAN, OF CLAREMONT, NEW HAMPSHIRE, ASSIGNOR TO SULLIVAN MACHINERY COMPANY, A CORPORATION OF MASSACHUSETTS

ELECTRIC MOTOR CONTROLLING SYSTEM

Application filed December 31, 1927. Serial No. 243,964.

My invention relates to electric motor controlling systems and more particularly to a controlling system wherein the motor is situated at a point remote from the controlling apparatus.

The invention is particularly adapted for the controlling of electric motors used in the operation of mining machinery. In such use it is contemplated that the main switches and controlling apparatus will be located at a point remote from the working face of the mine where there may be danger of explosion on account of the presence of combustible gas, and at the same time permit the actual control of the motor by the operator at the working face of the mine. It is desirable in machines for coal cutting to cut down the weight and space required by the machine and it is therefore an important advantage to have the controlling apparatus at a point remote from the machine where space requirements are not so important.

Among the objects of my invention are therefore: to provide a generally improved control system for electric motors; to provide improved controlling means enabling location of the controlling apparatus of an electric motor at a point remote from the motor itself and at the same time to have the motor under the complete control of the operator at the machine; to simplify the construction and arrangement of the various parts in a control system of the type specified and especially to reduce the number of wires leading from the motor to the controlling apparatus to a minimum. It is a still further object of my invention to provide a reverse switch for effecting reversal of the motor under the control of the operator at the machine, and in one embodiment of the invention there is provided an interconnection between the reverse switch and the control circuit switch at the machine to insure against the closing of the latter until the reverse switch is in one of its closed positions. Another object is to provide an overload relay operating in conjunction with the control circuit and located at a point remote from the motor for shutting down the motor in the event of an overload. Other objects and advantages of my invention will hereinafter more fully appear.

In the accompanying drawings I have shown for purposes of illustration one embodiment which my invention may assume in practice.

In these drawings,—

Figure 1:
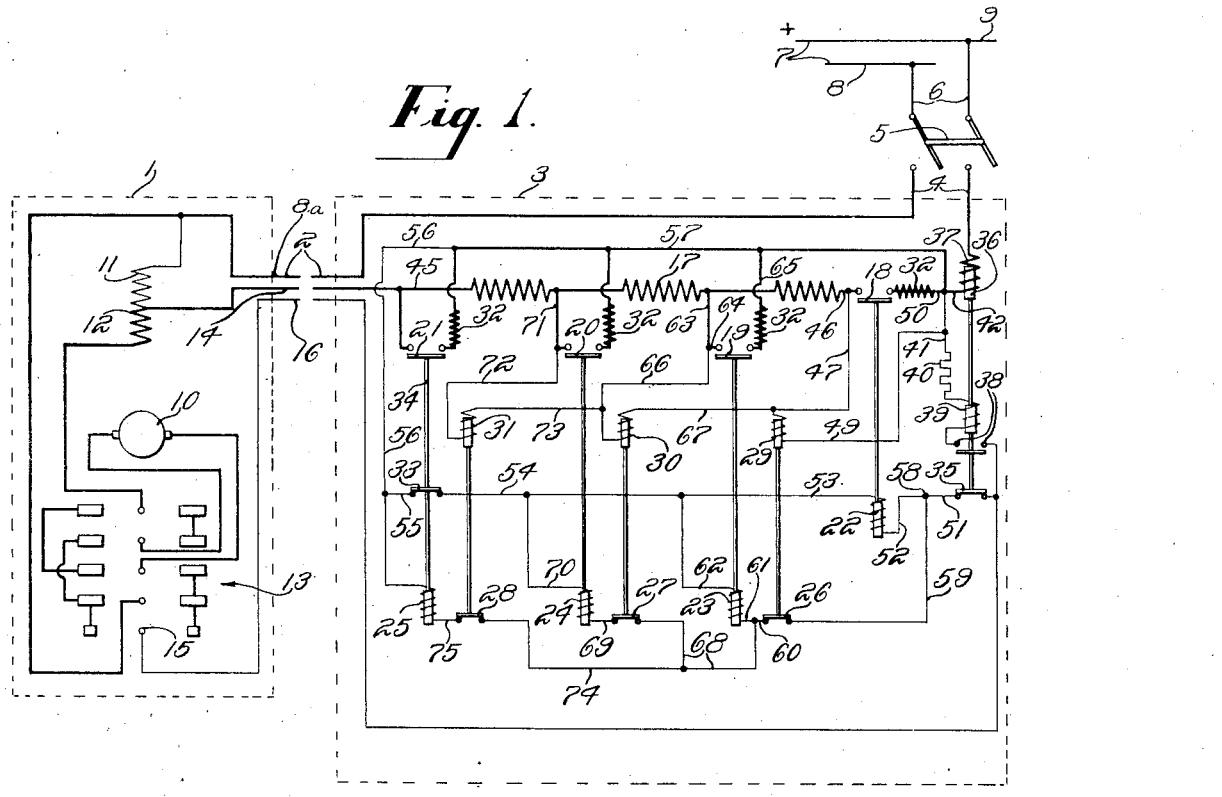
Fig. 1 is a wiring diagram of my invention as applied to a direct current motor and controlling apparatus.

In Fig. 1 it will be observed that a mining machine 1 is connected by a long flexible cable 2 with the controlling apparatus 3 which is in turn connected by another cable 4 to a main line switch 5. This main line switch in turn is adapted to receive current through a flexible cable 6 from the power circuits 7 in the entry of the mine. The controlling apparatus 3 as well as the switch 5 may be set up at any suitable point, even several hundred feet away from the mining machine if desirable.

The embodiment of my invention effecting control of a direct current motor will now be described. The direct current power lines are indicated at 8 and 9 at the right hand side of the figure. The apparatus shown in the left portion of the figure is located adjacent the motor while all the apparatus illustrated in the right hand portion of the figure may be placed at any suitable location remote from the motor where there will be no danger of explosions from the presence of combustible gas and where the space requirements are not so important. The motor 10 is of the compound wound type having a shunt field 11 and series field 12, power being supplied to the motor through a reverse switch 13 over the wire 8ª and another wire 14 leading from the controlling apparatus. Power for the control circuit is supplied to the controlling apparatus over the negative main power line 8 and through a manually controlled switch 15 and a wire 16 leading from the mining machine to the controlling apparatus. The controlling apparatus which is located at a suitable remote point comprises an adjustable resistance 17 and automatic contactors 18, 19, 20 and 21 adapted to operate in the order indicated to connect the motor to the power lines across all of said resistances and to progressively cut out said resistance as the motor comes up to speed. These automatic contactors are adapted to be operated respectively by means of coils 22, 23, 24 and 25 which are supplied with current from the control circuit in a manner to be later described. A series of supplemental switches 26, 27 and 28 controlled by coils 29, 30 and 31 respectively, accomplish the purpose of providing the necessary time element between the operation of the contactors in a manner which will later appear. Suitable blowout coils 32 are provided for extinguishing the arc at each of the main contactors in a well known manner. A switch 33 is mechanically connected by means of a link 34 to the switch 21 so that on the closing of the last contactor the control circuit through most of the holding coils will be broken, thereby cutting down the consumption of current in the control circuit. An overload relay switch 35 is connected in the control circuit to interrupt the same in the event of an excessive load upon the motor. For this purpose it will be noted that the solenoid 36 has a coil 37 connected to the power line 9 and is so adjusted that when the current reaches a certain predetermined value, the switch 35 will open. When this occurs, the switch is adapted to close a circuit through a contact device 38, an electromagnet coil 39, a suitable resistance 40 and wire 41 to the positive side of the line by way of the wire 42 whereby current is supplied to the electromagnet 39 whereby the switch 35 is held in such a position as to interrupt the control circuit.

It is believed that the operation of the automatic controlling apparatus for the direct current system will be easily understood from the above description as the connections between the devices are progressively indicated. When the connection is made to the power supply, as by means of the switch 5 in the entry of the mine, though the main switch 13 is still in neutral position, a circuit will be established through the wire 8ª, shunt field 11, wire 14, wire 45 through all of the resistance 17, wires 46 and 47 through coil 29, wires 49, 50 and 42 to the positive side of the line. This energizes coil 29, thereby opening the switch 26. If it is now desired to start the motor, the reverse switch 13 is adjusted to the desired position and the switch 15 closed, which may be and preferably is done automatically as later described. Thereupon the control circuit is established thorugh the switch 15, control wire 16, switch 35, wires 51, 52, coil 22, wires 53, 54, switch 33, which is normally closed, wires 55, 56, 57 and 42, to the positive side of the line. This energizes the holding coil 22 for the contactor 18 which closes the motor circuit through all of the resistance 17, wires 46, switch 18, wire 42 to the positive side of the line, 9. The closing of the switch 18 short-circuits coil 29, whereupon the current in this coil gradually dies out, the time required being dependent on the inductance of the coil, and the switch 26 closes. At this time the control current divides at 58, a portion thereof flowing over the wire 59, switch 26, wires 60, 61, coil 23, wires 62 and 54, back to the positive side of the line through the switch 33 as heretofore described. This energizes the coil 23, thereby closing contactor 19 which cuts out the first portion of the resistance and allows the motor current to flow through the wires 63 and 64, switch 19, wire 65 to the positive side of the line.

It will be noted that at the time the contactor 18 is closed, there will be a current flowing through the wires 63, 66, coil 30, wires 67, 47, switch 18, and wire 42 due to the voltage drop across the first portion of the resistance. This current has energized coil 30 opening the switch 27. On closing of the switch 19, coil 30 is short-circuited and the switch 27 closes after a certain interval of time necessary for the current in the coil to die out. The closing of the switch 27 then establishes a circuit through the wires 51, 59, switch 26, wires 60, and 68, switch 27, wire 69, coil 24, wires 70 and 54 to the positive side of the line, as previously described, which closes switch 20. The closing of the switch 19 has established a circuit opening the switch 28 by reason of the voltage drop across the central portion of the resistance through the wires 71, 72, coil 31, wires 73, 66 and 63. Closure of switch 20 short circuits coil 31. The coil 31 and switch 28 provide the necessary time interval between the closing of the switches 20 and 21 in a manner similar to that already described in connection with the coil 30 and switch 27. The coil 25 is energized through the closing of the switch 28; and this operates to simultaneously close the switch 21 and open the switch 33 by means of the mechanical connection 34. The opening of the switch 33 interrupts the circuit through all the holding coils except 25, thereby cutting down the current consumption of the control circuit. The coil 25 is, however, energized by current through the wire 16, switch 35, wires 51 and 59, switch 26, wires 60, 68 and 74, switch 28, wire 75, and back to the positive side of the line through the wires 56, 57, and 42. In the event of an overload, the solenoid 36 will lift the switch 35, thereby opening the circuit through the coil 25 and thus breaking the motor circuit. At the same time the circuit is established through the coil 39 which holds the switch 35 open until switch 15 at the machine is again manipulated. It will be understood that the devices 29, 30 and 31 are of relatively high self-inductance, so that when short circuited a substantial delay in operation is effected.

Figure 2:
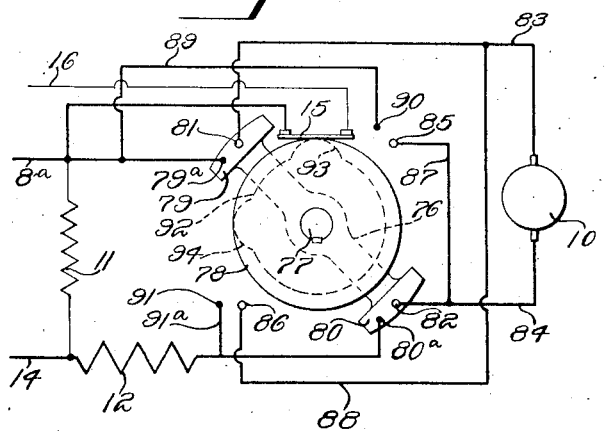
Fig. 2 is a diagrammatic view of the reverse switch and control circuit switch at the mining machine.

Fig. 2 illustrates the manner in which the reverse switch and control circuit switch may be arranged. This mechanism, in the form shown, comprises an arm 76 fixed to a shaft 77 which may be operated by any suitable means such as a gear 78 and actuating mechanism therefor (not shown). The arm 76 carries on its ends a plurality of movable contactor members 79 and 80 suitably insulated from each other. In the position shown in Fig. 2 these contacts act to connect a contact 79ª, connected to wire 8ª and a contact 80ª, connected to wire 14, respectively to other contacts 81 and 82 which are connected by wires 83 and 84 to the brushes. When the shaft 77 is turned clockwise through an angle of 90 degrees the movable contacts 79 and 80 will connect a second set of stationary contacts 85 and 86, which are connected to the brushes through wires 87 and 88, with contacts 90 and 91, the last mentioned contacts being connected by wires 89 and 91ª to the lines 8ª and 14 respectively. Current then flows from main line 8 through wire 89, contacts 90 and 85, wires 87, 84, armature A, wires 83, 88, contacts 86 and 91 to line 14, thus effecting reversal of the motor. The shaft 77 also carries a plate cam 92 which may, if desired, be made integral with the gear 78, and this cam has a plurality of projections 93 and 94 each adapted to engage the switch 15 and close the same in either of the closed positions of the reverse switch. It will be noted that these projections are so positioned that the control circuit switch 15 cannot be effective until after the movable contacts on the arm 76 have connected sets of stationary contacts; and the operating mechanism may be so designed as to provide for a certain time interval between these operations.

As a result of my invention it will therefore be apparent that the controlling apparatus for a motor which may include an adjustable resistance as well as an overload cut out, may be located at any point remote from the machine and at the same time the machine is under complete control of the operator. An important advantage is the accomplishment of this result with the necessity for only one additional wire between the machine and controlling apparatus. It will of course be obvious that my invention is applicable to other types of controlling apparatus than the one illustrated and described.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an electric motor control system, a motor, main power lines leading thereto, an adjustable resistance, switches for connecting said motor to said power lines through all of said resistance and for progressively cutting out said resistance as the motor comes up to speed, electromagnetic means for operating each of said switches, a control circuit for supplying current to said electromagnetic means to effect operation of said switches in predetermined sequence, and mechanical means for automatically breaking the circuit through all of said electromagnetic means except the one for operating the last switch on the closing of the last switch, and an operator controllable switch in said control circuit.

2. In an electric motor control system, a motor, main power lines leading thereto, an adjustable resistance, switches for connecting said motor to said power lines through all of said resistance and for progressively cutting out said resistance as the motor comes up to speed, electromagnetic means for operating each of said switches, a control circuit for supplying current to said electromagnetic means to effect operation of said switches in predetermined sequence, and means for automatically breaking the circuit through all of said electromagnetic means except the one for operating the last switch on the closing of the last switch including a switch in the circuit last mentioned movable with said last switch, and an operator controllable switch in said control circuit.

3. In an electric motor control system, a motor, main power lines leading thereto, an adjustable resistance, switches for connecting said motor to said power lines through all of said resistance and for progressively cutting out said resistance as the motor up to speed, electromagnetic means for operating each of said switches, control circuits for supplying current to said electromagnetic means to effect operation of said switches in predetermined sequence including switches having operating circuits controlled by cutting out of the resistance, and means for automatically breaking the circuit through all the electromagnetic means operating resistance cut out switches except the one operating the last resistance cut out switch, on closing of the last resistance cut out switch, and an operator controllable switch controlling the control circuits.

4. In an electric motor control system, a motor, main power lines leading thereto, an adjustable resistance, switches for connecting said motor to said power lines through all of said resistance and for progressively cutting out said resistance as the motor comes up to speed, electromagnetic means for operating each of said switches, control circuits for supplying current to said electromagnetic means to effect operation of said switches in predetermined sequence including switches having operating circuits controlled by cutting out of the resistance, and means including a switch element mechanically connected for movement with the last resistance cut out switch for automatically breaking the circuit through all the electromagnetic means operating resistance cut out switches except the one operating the last resistance cut out switch, on closing of the last resistance cut out switch, and an operator controllable switch controlling the control circuits.

5. In an electric motor control system, a proper circuit, a motor, and a resistance, and controlling apparatus adapted to connect the power circuit to the motor including a plurality of automatic switches adapted to close in sequence to cut out the resistance as the motor comes up to speed, coils acting when energized respectively to close each of said switches, means for energizing said coils to effect timed operation of said switches including a second series of switches, coils acting when energized one to open each of said latter switches, the coil of the second series controlling the third switch of the first series being supplied with current effective to operate the switch only when the first switch of the first series is closed and short circuited when the second switch of the first series is closed, the interval between the closing of the second and third switches of the first series depending upon the dying out of the current in the above mentioned coil of the second series.

6. In an electric motor control system, a power circuit, a motor, and a resistance, and controlling apparatus adapted to connect the power circuit to the motor including a plurality of automatic switches adapted to close in sequence to cut out the resistance as the motor comes up to speed, coils acting when energized respectively to close each of said switches, means for energizing said coils to effect timed operation of said switches including a second series of switches, coils acting when energized one to open each of said latter switches, the coil of the second series controlling the third switch of the first series being supplied with current effective to operate the switch only when the first switch of the first series is closed and short circuited when the second switch of the first series is closed, the interval between the closing of the second and third switches of the first series being substantial and depending solely upon the dying out of the current in the above mentioned coil of the second series.

7. In a system of control, a power circuit, a resistance, and circuit controlling means including a plurality of contactors intended for operation in succession to effect progressive cutting out of the resistance from said power circuit, and a timing coil of relatively high self-inductance for timing the closing of the third contactor of the series with respect to the closing of the second contactor of the series, and means whereby said timing coil is first supplied with current sufficient to render the same effective when the first contactor of the series is closed and short circuited when the second contactor of the series is closed.

8. In an electric motor control system for a circuit carrying direct current from a remote point to a motor of the compound wound type, in combination, a main line switch at a remote point, a controller interposed in one of the lines of the circuit at the remote point, electrical means for operating said controller, a secondary circuit including one of the lines of the main circuit extending between the motor and said remote point for supplying current to said electrical means, a reverse switch for effecting reversal of the motor located at said motor, and means controlled by movement of said reverse switch for making and breaking said secondary circuit, the circuits between said remote point and said motor requiring only three lines.

9. In an electric motor control system, in combination, a reverse switch and controlling apparatus both adapted to be connected in the power circuit leading to the motor, said controlling apparatus being provided with electrical means for operating the same, a secondary circuit for supplying current to said electrical means including a control switch for controlling such supply and an overload relay switch adapted to automatically interrupt such supply upon excessive current in the power circuit leading to the motor, said secondary circuit requiring only one line in addition to the motor power circuit, and means for holding said overload relay switch open until said control switch is operated, an interlock being provided between said control switch and said reverse switch so that the reverse switch must be brought to neutral position when the control switch is operated to release said overload relay switch.

10. In an electric motor control system, in combination, a motor, main power lines leading thereto, a reverse switch connected in said power lines adjacent said motor, controlling apparatus connected in said power lines at a point remote from said motor, said controlling apparatus being provided with electrical means for operating the same, means for supplying current to said electrical means including a control switch for controlling such supply and an overload relay switch for automatically interrupting such supply upon excessive current in the power lines leading to said motor, and means for holding said overload relay switch open until said control switch is operated, an interlock being provided between said control switch and said reverse switch so that the reverse switch must be brought to neutral position when the control switch is operated to release said overload relay switch.

11. In a system of control, a motor, a power circuit, a multistep resistance, a plurality of contactors for respectively connecting said motor through the entire resistance with the power circuit and cutting out the steps of the resistance successively, and electromagnetic means for controlling said contactors including circuits controlling contactors cutting out resistance and having control switches provided with electromagnetic operating devices of relatively high self-inductance, and circuits for said electromagnetic operating devices energized by voltage drop across steps of the resistance on closure of certain of said contactors and short circuited on closure of subsequent contactors, the circuits of all but the last of said electromagnetic contactor controlling means including a switch opened on closure of the last contactor.

12. In combination, a motor, and controlling means therefor including a reversing switch having a reversely movable operating element, cam means movable with the latter, and means operable by said cam means on movement of said reverse switch operating element in either direction to establish current flow for the motor controlled by said reverse switch.

In testimony whereof I affix my signature.

CHARLES W. WYMAN.